US010737804B2

(12) United States Patent
Pruski et al.

(10) Patent No.: US 10,737,804 B2
(45) Date of Patent: Aug. 11, 2020

(54) METHOD FOR LOADING AND/OR UNLOADING A TRANSPORT DEVICE AT A RECEIVING CONTAINER

(71) Applicant: Deutsche Post AG, Bonn (DE)

(72) Inventors: Matthäus Pruski, Troisdorf (DE); Felix Vorwerk, Bonn (DE); Christoph Dautz, Bonn (DE)

(73) Assignee: DEUTSCHE POST AG, Bonn (DE)

( * ) Notice: Subject to any disclaimer, the term of this patent is extended or adjusted under 35 U.S.C. 154(b) by 165 days.

(21) Appl. No.: 15/771,135

(22) PCT Filed: Oct. 25, 2016

(86) PCT No.: PCT/EP2016/075639
§ 371 (c)(1),
(2) Date: Apr. 26, 2018

(87) PCT Pub. No.: WO2017/072101
PCT Pub. Date: May 4, 2017

(65) Prior Publication Data
US 2018/0362187 A1 Dec. 20, 2018

(30) Foreign Application Priority Data

Oct. 29, 2015 (DE) .......................... 10 2015 118 478
Nov. 12, 2015 (DE) .......................... 10 2015 119 544

(51) Int. Cl.
*B65G 67/00* (2006.01)
*B64F 1/32* (2006.01)
(Continued)

(52) U.S. Cl.
CPC ................ *B64F 1/32* (2013.01); *B64C 39/02* (2013.01); *B64C 39/024* (2013.01); *B64D 9/00* (2013.01);
(Continued)

(58) Field of Classification Search
CPC .............................................. B65G 2814/0398
See application file for complete search history.

(56) References Cited

U.S. PATENT DOCUMENTS 8,899,903 B1 12/2014 Saad et al.
9,928,749 B2 * 3/2018 Gil ........................ B65G 1/0435
(Continued)

FOREIGN PATENT DOCUMENTS

CA            2815850         11/2014
WO     WO 2014/080389 A2      5/2014

OTHER PUBLICATIONS

Search Report PCT/EP2016/075639, dated Oct. 25, 2016. (6 pages).
(Continued)

*Primary Examiner* — Mark C Hageman
(74) *Attorney, Agent, or Firm* — Dority & Manning, P.A.

(57) ABSTRACT

The invention relates to a method by which an unmanned transport device docked on a receiving container is loaded with a payload container for a consignment, having a loading device for loading the transport device with the payload container, wherein the payload container has a bearing at its first end, the transport device has a loading opening on its underside for receiving the payload container, and the loading opening, at its front end, has a mating contour corresponding to the bearing, and the method has the following steps: the payload container, arranged on the loading device, is pivoted in relation to the horizontal by the loading device such that the first end is elevated in relation to a second, opposite end of the payload container, the loading device is raised until the payload container ends up at least with its first end located within and/or beneath the loading opening, and the payload container is pivoted by the loading device into the horizontal for introduction into the loading opening such that, first of all, the bearing comes into engagement with the mating contour and, subsequently, the (Continued)

Figure 1:
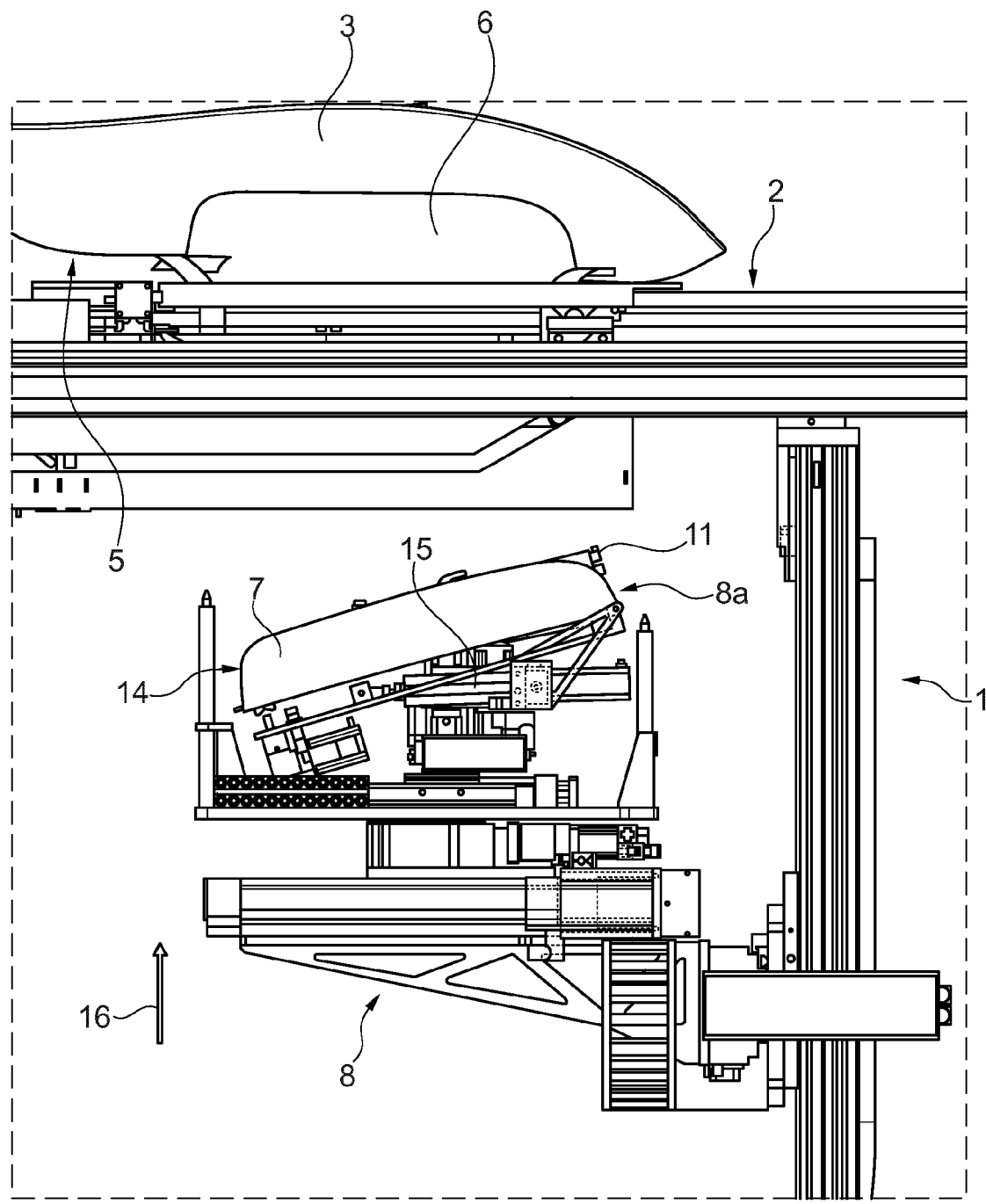

second end of the payload container comes into engagement with a rear end of the loading opening.

19 Claims, 8 Drawing Sheets

(51) Int. Cl.
    *B64D 9/00*           (2006.01)
    *B64C 39/02*         (2006.01)

(52) U.S. Cl.
    CPC ........ *B65G 67/00* (2013.01); *B64C 2201/128* (2013.01); *B65G 2814/0398* (2013.01)

(56) References Cited

U.S. PATENT DOCUMENTS

| | | | |
|---|---|---|---|
| 10,196,155 B2* | 2/2019 | Martin | B64F 1/00 |
| 10,363,826 B2* | 7/2019 | Wang | B60L 58/12 |
| 2010/0012769 A1 | 1/2010 | Alber et al. | |
| 2014/0032034 A1 | 1/2014 | Raptopoulos et al. | |
| 2014/0217230 A1 | 8/2014 | Helou, Jr. | |
| 2015/0063959 A1 | 3/2015 | Saad et al. | |
| 2015/0120094 A1 | 4/2015 | Kimchi et al. | |
| 2015/0175276 A1 | 6/2015 | Koster | |
| 2016/0059963 A1 | 3/2016 | Burgess et al. | |
| 2016/0163204 A1 | 6/2016 | Raptopoulos et al. | |
| 2016/0244187 A1* | 8/2016 | Byers | B64C 39/024 |
| 2019/0161190 A1* | 5/2019 | Gil | E05F 15/77 |

OTHER PUBLICATIONS

International Search Report (English Translation) PCT/EP2016/075639, dated Dec. 21, 2016. (2 pages).
German Search Report DE102015119544.5, dated Oct. 17, 2016. (7 pages).

* cited by examiner

METHOD FOR LOADING AND/OR UNLOADING A TRANSPORT DEVICE AT A RECEIVING CONTAINER

CROSS-REFERENCE TO RELATED APPLICATIONS

This application is related and claims priority to PCT/EP2016/075639, which published as WO 2017/072101 and is hereby incorporated by reference in its entirety for all purposes.

FIELD OF THE INVENTION

The invention relates generally to a method for loading an unmanned transport device, docked on a receiving container, with a payload container for a consignment, having a loading device for loading the transport device with the payload container. In addition, the invention relates generally to a method for unloading the unmanned transport device docked on the receiving container and also relates to the receiving container.

BACKGROUND OF THE INVENTION

Due to rising goods traffic as a result of general and mixed cargo journeys, truck or container transports, sea or air freight parcel transports within the framework of e-commerce and online mail order offers, the number of transport goods and, in particular, of packages and consignments has significantly increased. Although it is nowadays possible that an order can be placed online independently of conventional store opening times, the delivery of the order as a consignment to the consignee is made almost exclusively by traditional delivery methods, for instance by mailmen or, in the case of packages, by motorized delivery vehicles, and substantially only within store opening times. If the consignee cannot be located at the time of delivery, for instance because he, as an employed person, is pursuing his work within store opening times, either an attempt is made to deliver the consignment on a further occasion, or the consignment is deposited in a branch of the delivery company for collection by the consignee. Although for some time the possibility has existed of depositing consignments at a collection point, for instance in a DHL Packstation, such collection points are not yet widely available and thus not in all cases an alternative.

Very recently, trials have therefore been undertaken to deliver consignments to the consignee or the collection point with unmanned transport devices, for instance with an unmanned flying machine, also referred to as a parcelcopter or drone. In these trials, a receiving container is normally used to receive the consignment, to which the transport device can carry the consignment or from which the transport device can fetch the consignment. After the consignment has been carried by the transport device to the receiving container, which is installed, for instance, in the front yard of a house of the consignee or is provided for an urban district for a plurality of consignees, the consignment can be removed from the receiving container also outside store opening times.

In the aforementioned trials, the actual transfer of the consignment from the unmanned transport device to the receiving container has proved particularly difficult. For instance, a "dropping" of the consignment from the transport device to the receiving container is not possible, in order not to damage fragile consignments.

SUMMARY OF THE INVENTION

Aspects and advantages of the invention will be set forth in part in the following description, or may be apparent from the description, or may be learned through practice of the invention.

An object of the present invention is to transfer a consignment securely between an unmanned transport device and a receiving container.

Accordingly, the object is achieved by a method for loading an unmanned transport device, docked on a receiving container, with a payload container for a consignment, having a loading device for loading the transport device with the payload container, wherein the payload container has at its first end a bearing, the transport device has on its underside a loading opening for receiving the payload container, and the loading opening has at its front end a mating contour corresponding to the bearing, and the method includes the steps:

pivoting of the payload container disposed on the loading device in relation to the horizontal by the loading device such that the first end is elevated in relation to a second, opposite end of the payload container, raising of the loading device until the payload container ends up, at least with its first end, within and/or beneath the loading opening, and pivoting of the payload container into the horizontal by the loading device for introduction into the loading opening such that firstly the bearing enters into, in particular touching, engagement with the mating contour, and subsequently the second end of the payload container enters into, in particular touching, engagement with a rear end of the loading opening.

A fundamental aspect of the invention lies in the payload container in which the consignment is transferred by the loading device from the receiving container to the transport device. The transfer of the payload container is realized by a not purely linear motion, namely firstly by raising the payload container disposed on the loading device toward the transport device until said transport container at least ends up with its first end within or beneath the transport device. Subsequently, the loading device begins to pivot the payload container into the horizontal. As a result of the pivot motion, the bearing is firstly introduced into the mating contour and thereby enters into, in particular touching, engagement with the mating contour, so that the first end of the payload container is secured against falling out of the transport device. Once the payload container is pivoted fully into the horizontal by the loading device, the second end of the payload container bears, in particular in touching contact, against the rear end of the loading opening. The payload container is now fully inserted in the loading opening, so that the transport device can leave the receiving container in the direction of a destination. Experimentally, the proposed method has proved particularly reliable for being able to transfer even fragile consignments between the receiving container and the transport device.

The unmanned transport device is preferably designed as a flying machine, as an unmanned, uninhabited or unpiloted aerial vehicle, in abbreviation UAV, as a parcelcopter or as a drone. Possible embodiments of the transport device can be helicopters, multicopters, quadrocopters or tiltwings, to list just a few possibilities. Preferably, the transport device and/or the receiving container have mechanical and/or information technology devices, which enable the transport device and/or the receiving container to execute the method, thus, in particular, to execute the method automatically and/or autonomously. The transport device and/or the receiving container can have a microprocessor, a control device and/or a programmable logic controller, which with a software program for the execution of the method steps and/or possess communication devices for wired and/or wireless communication between the transport device and the receiving container. The consignment is, for instance, a mail item, a parcel, a registered mail item, a letter, or other transportable goods. The proposed steps are preferably executed in the stated sequence, though it is likewise possible that firstly the raising of the loading device is realized, and afterward the pivoting of the payload container in relation to the horizontal, or the steps are executed partly simultaneously.

Preferably, the payload container has at its first end two mutually spaced bearings, while, at the loading opening corresponding thereto, two mating contours are provided. The loading opening extends preferably into the inside of the transport device such that the payload container fully inserted in the loading opening completely fills the loading opening and/or fits positively in or bears positively against the loading opening. In the case of an extending payload container which is oval and/or rectangular in top view, the bearing is preferably disposed on the first transverse side, so that, upon the raising and/or pivoting of the loading device, the payload container is firstly introduced with its first transverse side into the loading opening. Likewise, it can be possible that the payload container is raised by the loading device to beneath the loading opening, and the following pivoting of the payload container into the horizontal includes a motion in the vertical direction up into the loading opening and/or a tilting of the payload container.

According to a preferred refinement, the method includes, after the introduction of the payload container into the loading opening, the step of locking the second end of the payload container to the transport device by use of the loading device, wherein the locking is realized, in particular, by turning of a locking device disposed at the second end of the payload container, and/or, after the introduction of the payload container into the loading opening, the step of lowering the loading device until the loading device is disposed within the receiving container. After the locking of the payload container, this is held at the first end by the bearing which engages in the mating contour, and is secured at its second end, by the locked locking device, against falling out of the loading opening. The locking device preferably has a rotary body, which, for the locking, can be led out of the payload container by a rotary motion into the transport device. For the positionally accurate orientation of the locking device in relation to the transport device, at the second end of the payload container, in the payload opening, is preferably provided a guide, which, upon the pivot motion into the horizontal, engages in a longitudinal member or the like of the transport device and in this way effects a guidance. Through the lowering of the loading device and the, where necessary, following closure of a hatch of the receiving container, the loading device within the receiving container is protected against dirt contamination by external influences. On a top side of the payload container can be arranged a latching hook, which, as a result of the pivot motion, engages in a further longitudinal member or the like of the transport device. Preferably, two mutually spaced latching hooks are provided, which engage in the same further longitudinal member. The latching hook is preferably disposed on the payload container midway along the longitudinal extent thereof.

According to a particularly preferred refinement, the payload container and/or the loading opening is designed such that, during the pivoting into the horizontal and/or in the horizontal, at least the first end of the payload container bears positively against at least the front end of the loading opening. Upon the introduction of the payload container into the loading opening, the payload container swivels in relation to the transport device via a rotational axis into the loading opening. The rotational axis is formed independently by the approach of the payload container to the loading opening, as a result of said positive locking. Upon the below-described unloading of the payload container from the transport device, the rotational axis correspondingly independently disperses again. Due to the intrinsic weight of the payload container, the bearing, upon the unloading, analogously detaches from the mating contour.

According to a preferred refinement, the loading device has, correspondingly to the first end and/or to the second end of the payload container, a spindle, the transport device has at the front end and/or at the rear end a bushing corresponding to the respective spindle, and the raising of the loading device is realized such that the spindle engages, in particular in touching contact, in the bushing. Preferably, three or four spindles and bushings, respectively, are provided, for instance respectively one or two spaced apart at the front end and/or one or two at the rear end, in particular one at the front and two at the rear. By the spindles and bushings, it is advantageously ensured that the raising of the loading device, with payload container disposed thereon, is realized in a positionally accurate manner, namely until the spindle engages, in particular in touching contact, in the bushing, so that, subsequently, the pivoting of the payload container into the loading opening can likewise be realized in a positionally accurate manner. Furthermore, tolerances between loading device and transport device, which tolerances can change over time after each flight or landing, are in this way compensated. It is therefore sensible to firstly raise the transport device, for instance by just a few millimeters, and only then to perform the loading or unloading.

For the electrical contacting of payload container and transport device, the payload container, according to a preferred refinement, has at its first end a first plug arranged such that, and the loading opening has at its front end a second plug arranged correspondingly to the first plug such that, by pivoting of the payload container into the horizontal, the plugs are connected one to the other. For the design of the plugs, in principle various possibilities exist, where preferably, however, on the payload container, a fourteen-pole bushing on the one hand, and a twenty-pole bushing on the other hand, and accordingly within the loading opening corresponding thereto, are arranged a fourteen-pole plug and a twenty-pole plug.

Experimentally, it has proved particularly advantageous, according to yet another refinement, if the second plug is floatingly supported at the loading opening such that the second plug is arranged rigidly in the plug-in direction and elastically orthogonally to the plug-in direction. Insofar as the first plug is arranged rigidly on the payload container, for instance is bolted thereto, when the payload container is pivoted into the horizontal, tolerances in the horizontal and vertical direction between the plugs can advantageously be compensated, because of the elastic mounting, upon the connection of the plugs.

In this context, it has proved particularly advantageous if, according to a preferred refinement, the first plug has a pin plate designed such that, and the second plug has a pin receptacle designed such that, by pivoting of the payload container into the horizontal, the pin is guided by the pin receptacle such that firstly a tolerance between the plugs is reduced, and subsequently a positionally accurate orientation of the plugs one to the other is realized. The pin plate having the pin can be glued above onto the first plug. The pin receptacle is preferably constructed in the style of a projection and has in the middle a narrowing slot, into which, upon the pivoting of the payload container, the pin is introduced and, as a result of the narrowing, is firstly "trapped" in a positionally accurate manner and is subsequently guided into the horizontal, whereby, during the connection of the plugs, the positionally accurate orientation of the plug ensues. Experimentally, it has proved advantageous if the second plug is arranged, in relation to the horizontal, slightly pivoted, for instance through 5°, toward the underside. As a result, the connection of the plugs upon the pivot motion of the payload container into the loading opening is simplified. Insofar as "above", "beneath" or the like is referred to within the scope of the invention, by this is always meant the position of the relevant feature during operation and, in particular, when the transport device is docked on the receiving container.

The object of the invention is additionally achieved by a method for unloading an unmanned transport device, docked on a receiving container, with a payload container for a consignment, having a loading device for unloading the payload container from the transport device, wherein the payload container has at its first end a bearing, the transport device has on its underside a loading opening, in which the payload container is disposed, and the loading opening has at its front end a mating contour which corresponds to the bearing and in which the bearing engages, in particular in touching contact, and the method includes the steps:

raising of the loading device until the loading device ends up beneath the loading opening on the payload container, in particular in touching contact, unlocking of the payload container at a second, opposite end of the same, pivoting of the payload container in relation to the horizontal by the loading device, such that the second end is lowered in relation to the first end of the payload container until the bearing no longer engages in the mating contour, lowering of the payload container in relation to the transport device by the loading device, and/or pivoting of the payload container into the horizontal by the loading device.

Just as in the previously described method for loading, also in the proposed method for unloading the payload container from the transport device no purely linear motion of the payload container takes place, but rather firstly a pivoting of the payload container out of the horizontal, and a following lowering of the payload container for unloading of the payload container from the transport device into the receiving container. Trials have revealed that, as a result of the proposed method for loading and unloading, payload containers can be transferred in a particularly secure and reliable manner between the transport device and the receiving container.

In principle, various possibilities exist as to how the loading device can be designed for the pivoting of the payload container and for the locking and unlocking of the payload container on the transport device. According to a particularly preferred refinement, it is provided that the loading device has a tilt cylinder for pivoting of the payload container and/or an actuator for unlocking and/or locking of the payload container to and/or from the transport device. The tilt cylinder is preferably integrated in the loading device, which, in a further preferred manner, has a receptacle for the, in particular positive-locking, reception of the payload container. The receptacle is pivotable by the tilt cylinder preferably out of the horizontal and back again into the horizontal. The actuator preferably includes a motorized tool, which can be led up to the payload container in the vertical direction for unlocking or locking of the locking device.

According to another preferred refinement, the method includes the steps: removal and/or depositing of the payload container from and/or in a storage position and/or a loading module by the loading device, opening and/or closing of a hatch on a landing platform of the receiving container for the landing of the transport device on the receiving container, and/or positionally accurate fixing of the landed unmanned transport device to the receiving container, in particular by a longitudinal and/or transverse guide. Preferably, the receiving container has a plurality of storage positions, in which empty payload containers, or payload containers already filled with a consignment, are storable. The storage positions are preferably arranged within the receiving container such that they are protected against weather influences. The loading device is preferably refined to deposit the payload container in the storage position and/or to remove it from the storage position for loading of the transport device. The loading module is preferably designed such that an operator can place a consignment into the payload container.

On the receiving container can be provided, for instance, a door opening, through which the operator can introduce the consignment into the payload container held ready in the receiving container. By a light barrier, it can be checked whether the consignment is placed in the prescribed manner into the payload container. Moreover, a weighing machine can be provided, by which it can be checked whether the consignment has exceeded a maximally permitted weight of the payload container. Likewise, a check for inadmissible content, such as explosive, etc., can be performed by an x-ray machine or the like. Once the payload container on the loading module is loaded and/or unloaded, the loading device can, on the one hand, temporarily store the payload container in the storage position, or load a transport device, docked on the receiving container, with the payload container. In a further embodiment, the consignment is conveyed via a transport system to a corresponding payload container. Moreover, the barcode of the consignment can be scanned, and subsequently an assignment can automatically be made to a payload container. Likewise, a warehouse management system can be provided, which system in turn notifies the receiving container of the Packstation to which should be flown. Finally, it can also be possible that, after the unloading of the payload container, a text is sent to the consignee of the consignment.

The hatch is preferably provided in a roof of the receiving container and opens automatically when the transport device is aerially approaching the receiving container. For instance, the receiving container can include a dome designed as a hatch, which opens for the landing of the transport device. Once the transport device is landed on the receiving container, the hatch can close and, after completed loading, reopen in order that the transport device can aerially depart the receiving container. Following departure of the transport device, the hatch preferably closes in order that the landing platform, the loading device and/or the inside of the payload container is protected against weather influences such as rain, wind or snow. The hatch opens preferably at a one hundred and eighty degree (180°) angle in order that no air currents are generated on the landing platform.

The longitudinal and/or transverse guide is preferably designed to fix the landed transport device in a positionally accurate manner over the loading device. Insofar as, for instance, the transport device is docked on a landing platform having a diameter of three meters (3 m), the longitudinal and/or transverse guide displaces the transport device from the landing point toward an opening through which the loading device carries out the loading and/or unloading of the payload container. In order to turn the transport device in the wind direction before it flies away from the receiving container, the actuator or the landing device is preferably designed such that it is rotatable through three hundred and sixty degrees (360°). The longitudinal and/or transverse guide preferably fixes the transport device immediately after landing. Depending on the landing position of the transport device, the fixing is preferably realized at least at one skid end, or maximally at two skid ends, at a ninety degree (90°) orientation of the landing gear to the longitudinal and/or transverse guide, until the longitudinal and/or transverse guide is united and fixes all four (4) skid ends. On the longitudinal and/or transverse guide are preferably arranged so-called "arrows or triangles", for instance 2 in number, whereby the transport device is automatically rotatable in one of the four ninety degree (90°) directions (90°/180°/270°/360°) by a mechanical solution.

According to a preferred refinement, the payload container has at its first end a nose bearing, and the loading opening has at its front end a nose contour corresponding to the nose bearing. In conjunction with two bearings, the nose bearing advantageously forms, preferably with correspondingly two counter-corrections in the transport device, a rotational axis, wherein, by the nose bearing, on one side vertical, and on both sides horizontal forces, are absorbable, and, by the bearing, a vertical support in the opposite direction can be realized. By such a design, it can on the one hand be achieved that the payload container, when swiveled into the loading opening, is fixable in a particularly positionally accurate manner at this same and, on the other hand, the payload container, during transport by the transport device, is fixed in a secure and reliable manner to the transport device.

According to a preferred refinement, the pivoting is realized through an angle of no less than five degrees (≥5°) and no more than fifty degrees (≤50°), preferably no less than ten degrees (≥10°) and no more than thirty degrees (≤30°) and, quite particularly preferably, through an angle of 12°. Experimentally, it has been shown that the previously described positive locking can be maintained over an angle of rotation of approximately twelve degrees (12°), whereby the loading of the transport device with the payload container proves particularly simple.

For the design of the payload container, in principle various possibilities exist. According to a particularly preferred refinement, it is provided, however, that the payload container has a battery for powering the unmanned transport device, and the receiving container has a device for charging the battery. Apart from the consignment, in the payload container is thus also provided the battery for powering the transport device, for instance an accumulator or the like. The charging of the battery can be realized, for instance, in the storage position, so that, after an exchange of the payload container, the transport device can immediately fly off with a charged battery. The electrical connection between battery and transport device is preferably made by the previously described plugs. Apart from the loading of the battery, a continuous monitoring of the voltage can also take place. In addition, an automatic battery change of the batteries can take place. In this way, a payload container which can be loaded with consignments and with batteries, for instance via conveyor belts, before the entire payload container is loaded into the transport device, would be given.

The payload container is preferably designed on its outer side with a shell element such that, by the shell element, once the payload container is fully inserted in the loading opening, a seal is formed in the manner of a labyrinth principle and penetrating water is led off on an outer shell of the payload container. The battery, inclusive of the required cabling through to the plug, is preferably protected from spray water.

The object of the invention is additionally achieved by a receiving container, set up to implement the previously described method and designed as a mailbox, parcel box, parcel mailbox and/or Packstation for receiving the consignment, and/or as mobile variants such as a truck, swap body or ship. On a housing of the payload container is preferably prescribed the aforementioned door opening, through which a user has access to the loading module for the removal and/or loading of the payload container with the consignment.

FIGURES

Figure 2:
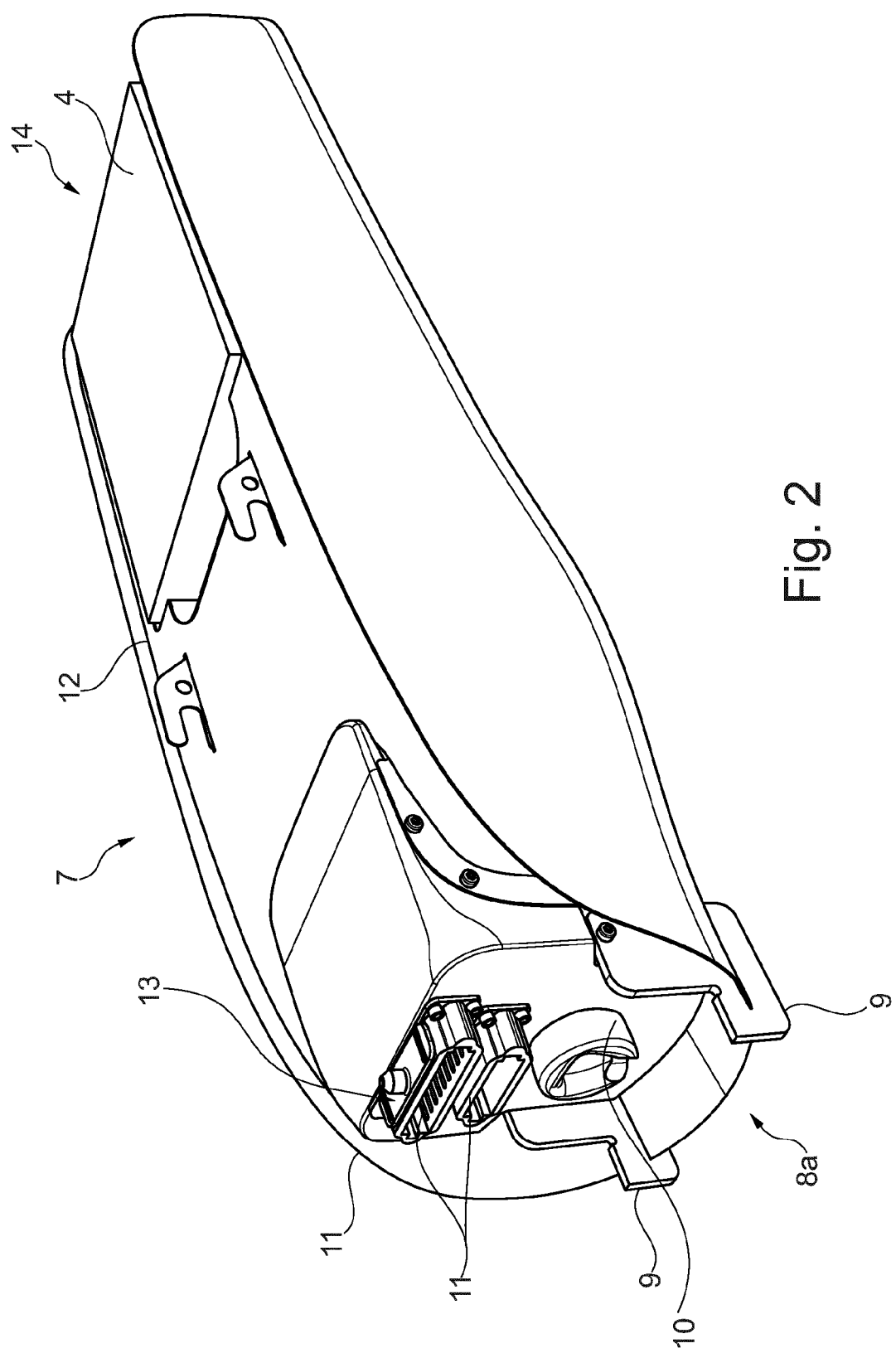
Figure 3:
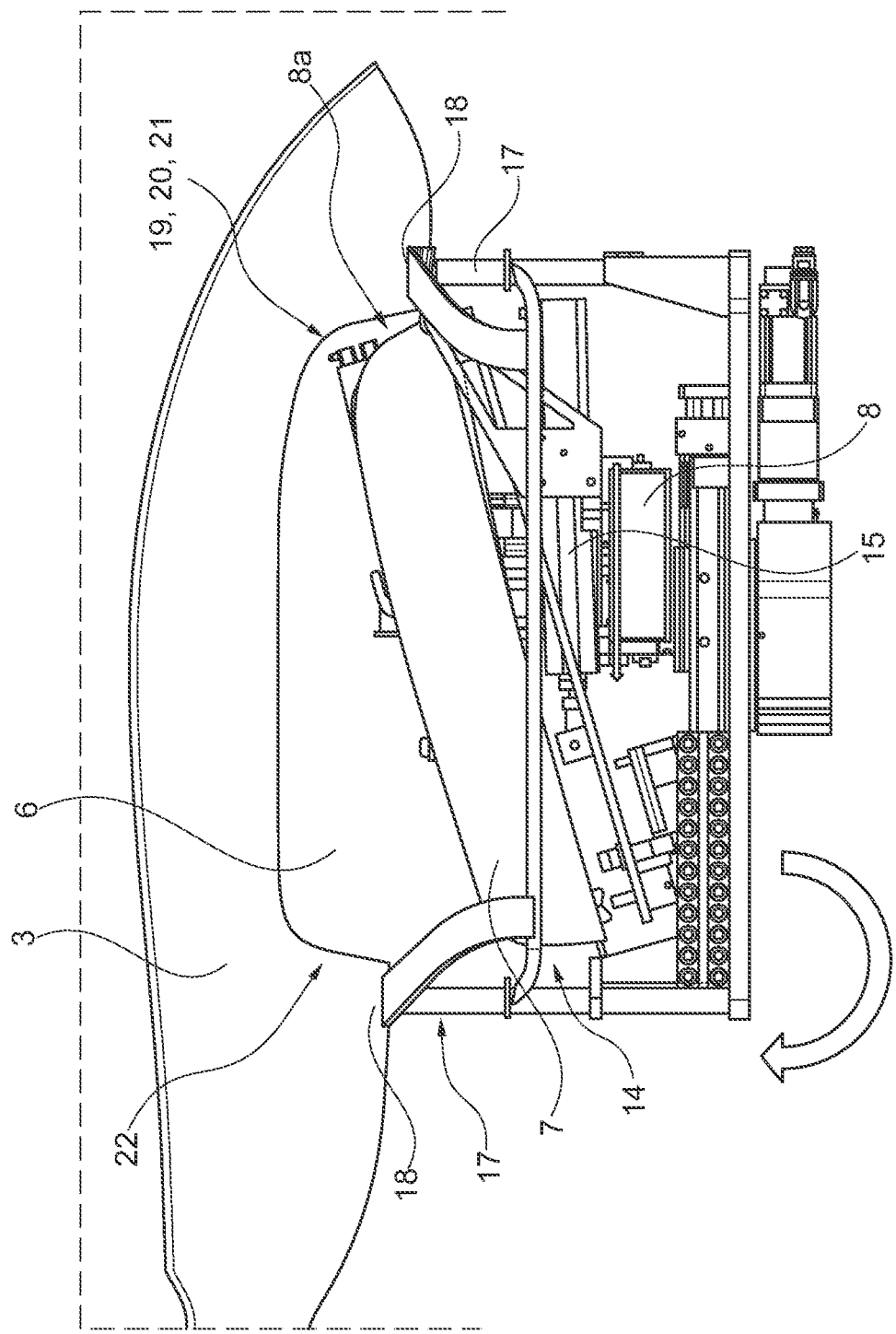
Figure 4:
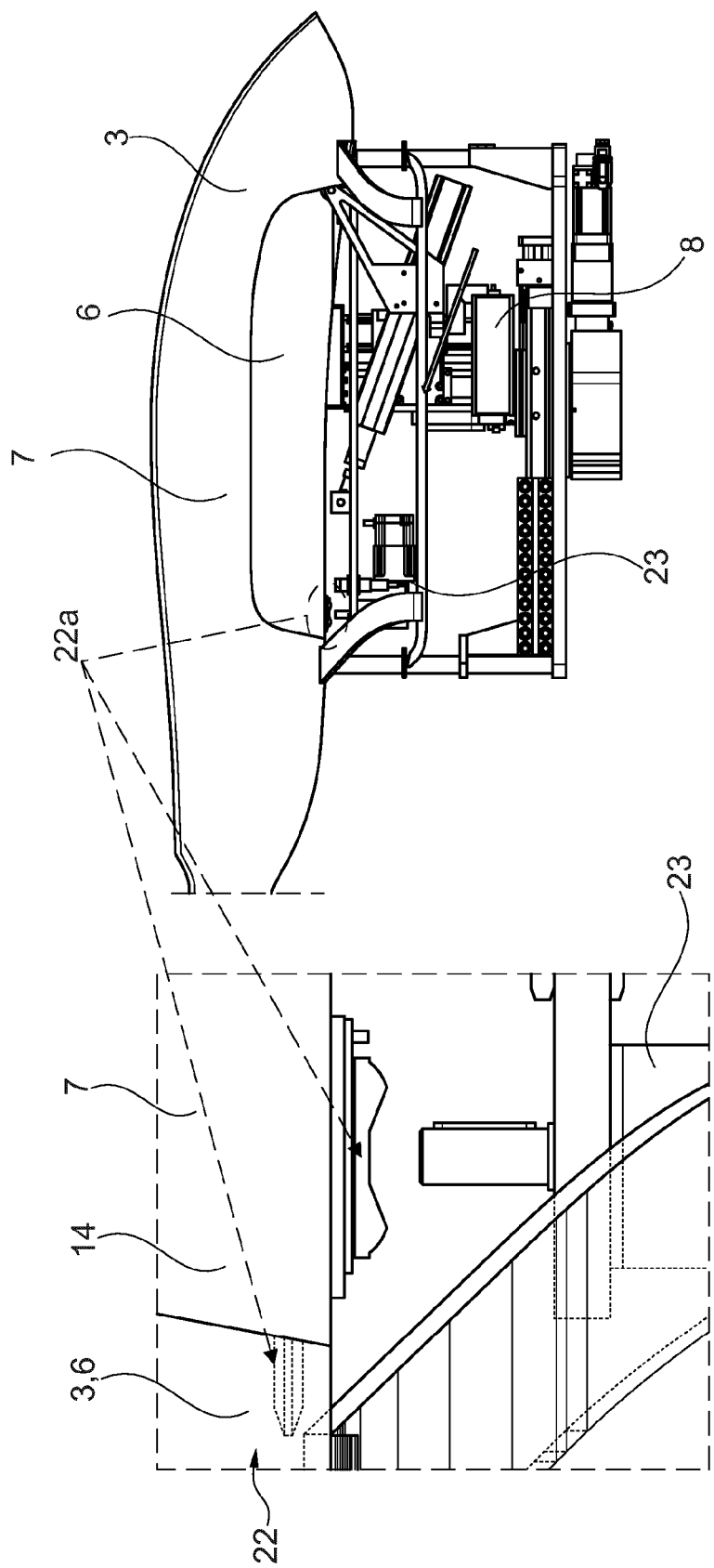
Figure 5:
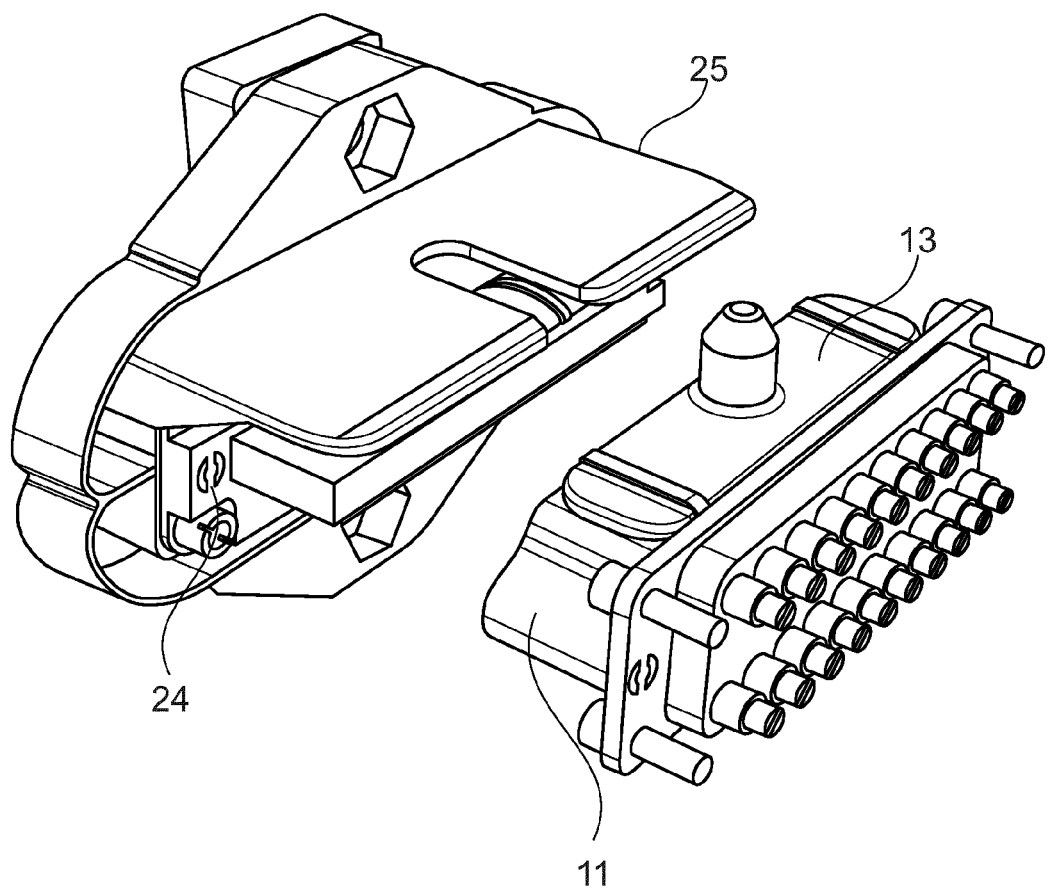
Figure 6:
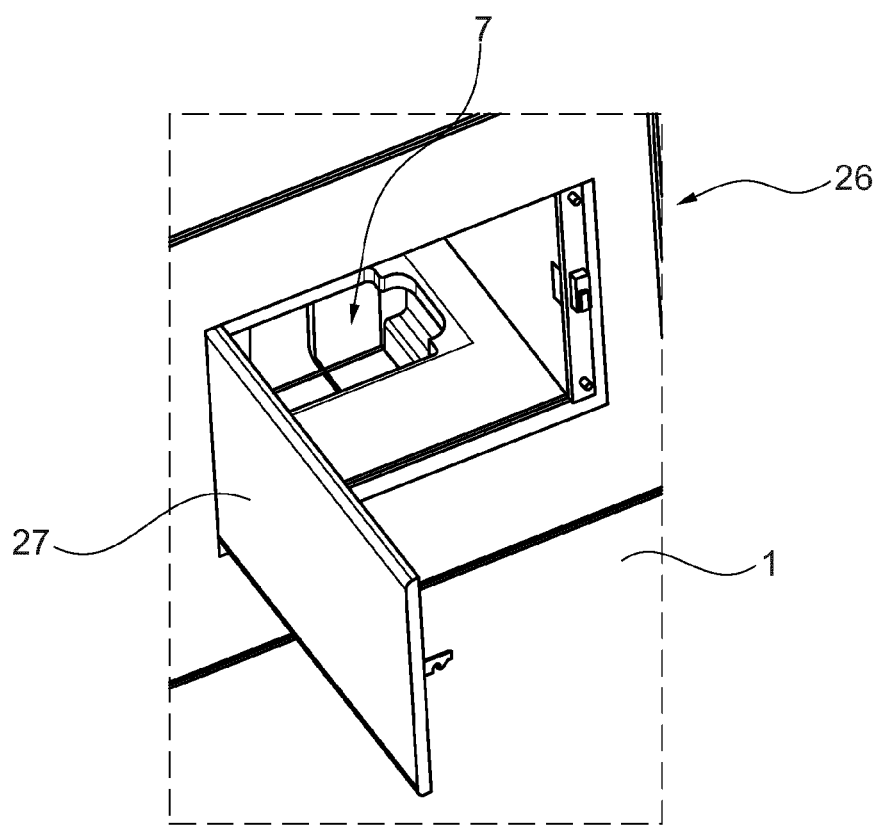
Figure 7:
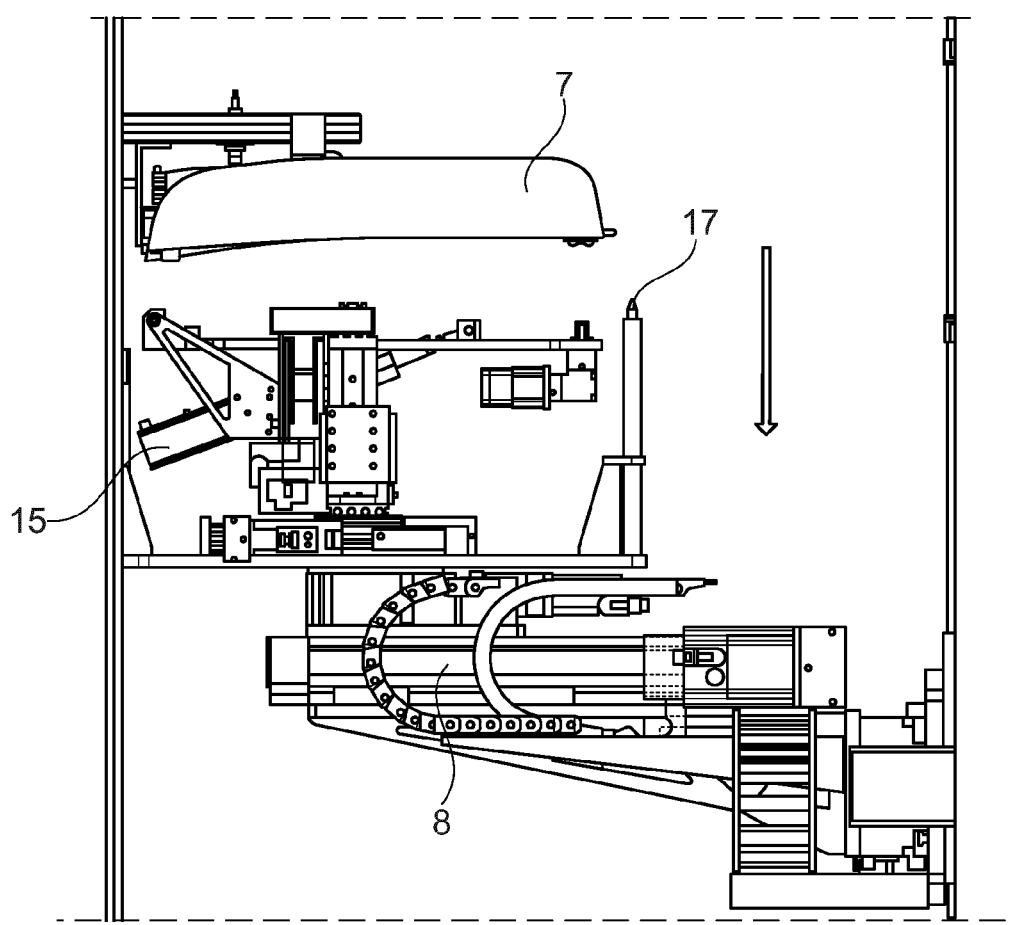
Figure 8:
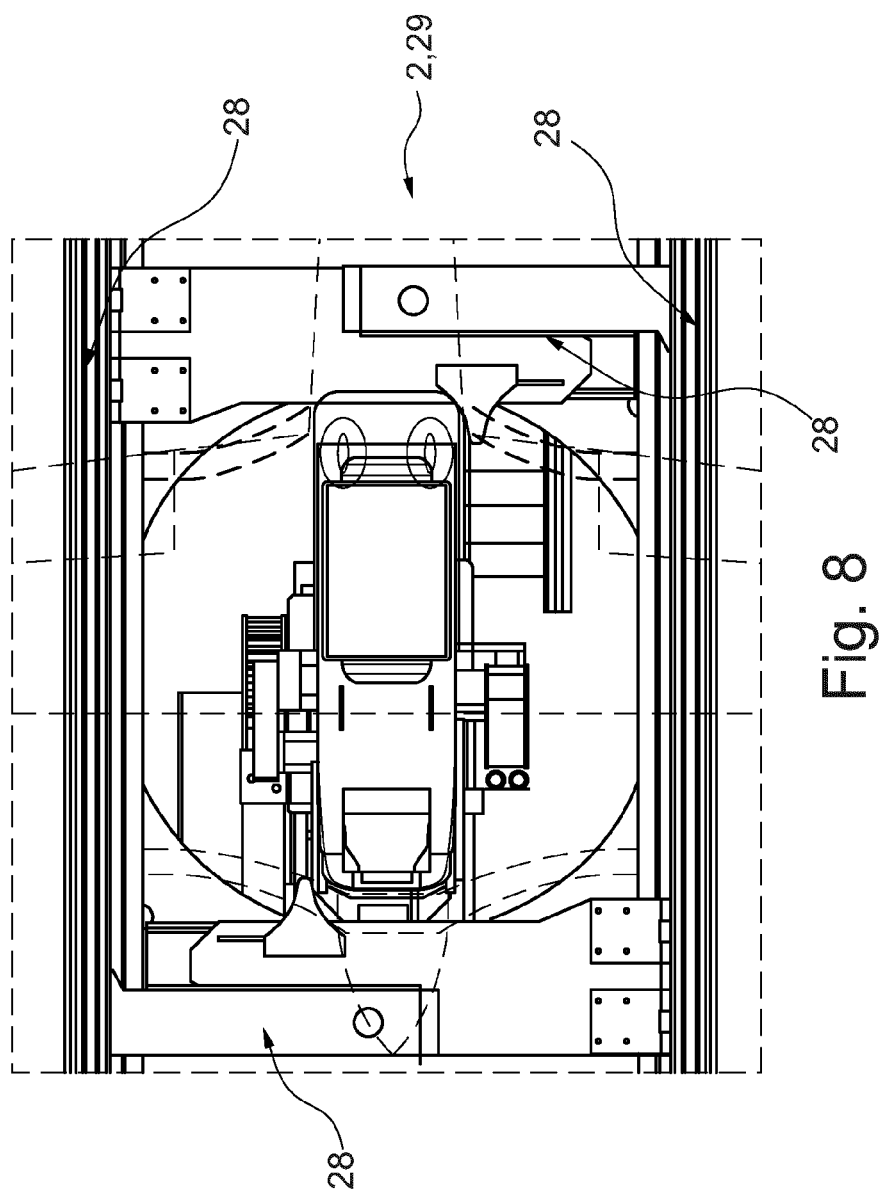

The invention is explained in greater detail below with reference to the accompanying drawings on the basis of a preferred embodiment, wherein:

FIG. 1 shows an inside of a receiving container in a schematic view according to a preferred embodiment of the invention, FIG. 2 shows a payload container in a schematic view according to the preferred embodiment of the invention, FIG. 3 shows a loading device with payload container and transport device in a schematic view according to the preferred embodiment of the invention, FIG. 4 shows a further view to FIG. 3, FIG. 5 shows a plug connection between payload container and transport device in a schematic view according to the preferred embodiment of the invention, FIG. 6 shows a closable opening in the receiving container according to FIG. 1, FIG. 7 shows the loading device according to FIG. 3 in a further view, and FIG. 8 shows a top view of the receiving container according to FIG. 1

DETAILED DESCRIPTION OF FIGURES

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 shows a schematic view of an inside of a receiving container designed as a parcel station. On a landing platform 2 of the receiving container 1 is docked an unmanned transport device 3. The unmanned transport device 3 is constructed as an autopilot drone, in the present case referred to as a parcelcopter, and has a drive to transport a consignment 4 (shown in FIG. 2) from the receiving container 2 toward a consignee (not shown). On the underside 5 of the transport device is provided a loading opening 6, into which a payload container 7 for the consignment 4 can be introduced. For the introduction of the payload container 7 into the loading opening 6, or for the removal of the payload container 7 from the loading opening 6, in the receiving container 1 is provided a loading device 8, also referred to as a loading manipulator.

FIG. 2 shows a perspective view of the payload container 7, which in top view has a rectangular shape. At a first transverse-side end 8a are provided two mutually spaced bearings 9, which extend in the longitudinal extent of the payload container 7 parallel to each other away from the payload container 7. Midway between the two bearings 9 there is arranged on the first side 8a of the payload container 7 a nose bearing 10, as well as two first plugs 11, which in the present case are constructed as a fourteen-pole bushing and as a twenty-pole bushing. In the direction of the top shell 12 of the payload container 7 is provided at a distance from the bearing 9, on the upper of the two first plugs 11, a pin plate 13, the pins of which extend perpendicular to the plug-in direction of the first plugs 11 away from the bearing 9.

For the loading of the transport device 3 with the payload container 7, the loading device 8 pivots the payload container 7 in relation to the horizontal into the position shown in FIG. 1, so that the first end 8a is elevated in relation to a second, opposite end 14. For the pivoting, the loading device 8 has a tilt cylinder 15. The loading device 8 located beneath the loading opening 6 subsequently moves, indicated by the arrow 16, in the direction of the transport device 9, until, as shown in FIG. 3, spindles 17 provided on the loading device 8 engage in corresponding bushings 18 of the transport device 3. On the loading device 8 are additionally provided, corresponding to the first end 8a and to the second end 14, respectively two mutually spaced spindles 17, which engage in corresponding bushings 18 on the underside 5 of the transport device 3.

Once the loading device 8 is in this way fixed to the transport device 3, the payload container 7, which, by being raised at its first end 8a, already reaches partly into the loading opening 6, is pivoted into the horizontal. As a result of the pivoting, the bearing 9 firstly enters into touching engagement with a mating contour 20 which at a front end of the loading opening 8 corresponds to the bearing 9. Corresponding to the nose bearing 10, at the front end 19 of the loading opening 6 is configured a nose contour 21, in which the nose bearing 10 engages in touching contact.

The bearings 9, 10, and the thereto corresponding contours 20, 21 are configured such that, over an angle of rotation of about twelve degrees (12°), a positive locking between payload container 7 and loading opening 6 is maintained, until, after complete pivoting of the payload container 7 into the horizontal, the second end 14 of the payload container is in touching engagement with a rear end 22 of the loading opening 6. In this way, the payload container 7 is accommodated fully and positively in the loading opening 6, as can be seen from FIG. 4. The payload container 7 is thus swiveled into the loading opening 6 not in a purely linear motion, but rather via a rotational axis configured at the first end 8a or the front end 9.

For the locking of the payload container 7 to the transport device 3, at the second end 14 a locking device 22 is provided. For the actuation of the locking device 22, the loading device has an actuator 23, which via a tool engages in the locking device 22 and, by a rotary motion, locks the second end 14 of the payload container 7, at the rear end 22 of the loading opening, to this latter.

Correspondingly to the first plug 11, at the front end 19 in the loading opening 6 a second plug 24 is arranged such that, by pivoting of the payload container 7 into the horizontal, the first plug 11 is introduced into the second plug 24. In order to compensate tolerances between the payload container 7 and the loading opening 6, the second plug 24 is floatingly supported at the loading opening 6 such that the second plug 24 is mounted rigidly in the plug-in direction and elastically orthogonally to the plug-in direction. Correspondingly to the pin plate 13, on the second plug 24 is arranged a pin receptacle 25, which, when the payload container 7 is pivoted into the horizontal, firstly "traps" the pin in order subsequently to guide the pin for the purpose of positionally accurate orientation of the plugs 11, 24 one to the other. In order that the first plug 11 can be introduced particularly easily into the second plug 24, the second plug 24 is angled by five degrees (5°) in relation to the horizontal.

The unloading of a payload container 7 from a transport device 3 docked on the receiving container 1 is realized analogously. Firstly, the loading device 7 is raised until this ends up beneath the loading opening 6 in touching contact against the payload container 7. Subsequently, by the actuator 23, the locking device 22a is unlocked. Subsequently, the payload container 7 is pivoted in relation to the horizontal such that the second end 14 is lowered in relation to the first end 8a, until the bearing 9 no longer engages in touching contact in the mating contour 20. The payload container 9 resting in this way on the loading device 8 is next lowered in relation to the transport device 3 into the receiving container 1 by the loading device 8, and is finally pivoted into the horizontal.

The loading device 8 conveys the payload container 7, with consignment 4 disposed therein, to a loading module 26 (shown in FIG. 6), which is disposed on an outer wall of the receiving container 1. In the outer wall is provided a closable opening 27, through which an operator can reach into the receiving container 1 and in this way remove the consignment 4 (not shown in FIG. 6) from the payload container 7. Likewise, it is possible to place a new consignment 4 into the payload container 7.

With the loading device 8 (shown in further view in FIG. 7), the payload container 7 can be deposited within the receiving container 1, moreover, in a plurality of storage positions in which empty payload containers 7, or payload containers 7 already laden with a consignment 4 can be temporarily stored. In this way, payload containers 7 can be successively loaded with consignments 4, or be transported by transport devices 3 away from the receiving container 1.

In order to enable a positionally accurate fixing of the transport device 3 docked on the receiving container 1, longitudinal and/or transverse guides 28 are provided, by which the transport device 3 can be oriented above the loading device 8 (as shown in top view in FIG. 8). Above the landing platform 2 is provided on the receiving container 1 a hatch 29, which is able to be opened or closed for the landing or flying away of the transport device 3 on or from the receiving container 1.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

REFERENCE SYMBOL LIST

Receiving container 1
Landing platform 2
Unmanned transport device 3
Consignment 4
Underside 5
Loading opening 6
Payload container 7
Loading device 8
First end 8a
Bearing 9
Nose bearing 10
First plug 11
Top shell 12
Pin plate 13
Second end 14
Tilt cylinder 15
Arrow 16
Spindle 17
Bushing 18
Front end 19
Mating contour 20
Nose contour 21
Rear end 22
Locking device 22a
Actuator 23
Second plug 24
Pin receptacle 25
Loading module 26
Opening 27
Longitudinal and/or transverse guide 28
Hatch 29

The invention claimed is:

1. A method for loading an unmanned transport device docked on a receiving container with a payload container for a consignment, the receiving container having a loading device for loading the unmanned transport device with the payload container, the payload container having a bearing at a first end of the payload container, the unmanned transport device having a loading opening for receiving the payload container on an underside of the unmanned transport device, the loading opening having a mating contour corresponding to the bearing at a front end of the loading opening, the method comprising:

pivoting the payload container disposed on the loading device with the loading device relative to a horizontal configuration such that the first end of the of the payload container is elevated relative to a second, opposite end of the payload container;

raising the loading device until at least the first end of the payload container is positioned within or beneath the loading opening; and pivoting the payload container into the horizontal configuration with the loading device in order to introduce the payload container into the loading opening such that the bearing firstly enters into engagement with the mating contour and the second end of the payload container subsequently enters into engagement with a rear end of the loading opening.

2. The method of claim 1, further comprising one or both of:

after introducing the payload container into the loading opening, locking the second end of the payload container to the transport device with the loading device by turning a locking device disposed at the second end of the payload container; and after introducing the payload container into the loading opening, lowering the loading device until the loading device is disposed within the receiving container.

3. The method of claim 1, wherein the payload container, the loading opening or both the payload container and the loading opening is designed such that, when the payload container pivots relative to the horizontal configuration or into the horizontal configuration, at least the first end of the payload container bears positively against at least the front end of the loading opening.

4. The method of claim 1, wherein the loading device has a spindle corresponding to the first end of the payload container or to the second end of the payload container, the transport device has a bushing that corresponds to the spindle at a respective one of the front end of the loading opening and the rear end of the loading opening, and raising the loading device comprises raising the loading device until the spindle engages in the bushing.

5. The method of claim 1, wherein the payload container has a first plug at the first end of the payload container, the loading opening has a second plug corresponding to the first plug at the front end of the loading opening, and the first and second plugs are arranged such that the first plug connects to the second plug when the payload container pivots into the horizontal configuration.

6. The method of claim 5, wherein the second plug is floatingly supported at the loading opening such that the second plug is supported rigidly in a plug-in direction and elastically orthogonal to the plug-in direction.

7. The method of claim 5, wherein the first plug has a pin plate, the second plug has a pin receptacle, and the pin plate and the pin receptacle are configured such that a pin of the pin plate is guided by the pin receptacle when the payload container pivots into the horizontal configuration in a manner that firstly reduces a tolerance between the first and second plugs and subsequently positions and orients the first and second plugs relative to each other.

8. The method of claim 1, wherein:

the loading device has one or both of a tilt cylinder and an actuator;

the tilt cylinder is configured for pivoting the payload container; and the actuator is configured for unlocking the payload container from the transport device, locking the payload container to the transport device, or both.

9. The method of claim 1, further comprising one or more of:

removing the payload container from a storage position and/or a loading module with the loading device, depositing the payload container in the storage position and/or the loading module with the loading device, or both;

opening, closing, or both opening and closing a hatch on a landing platform of the receiving container in order to land the transport device on the receiving container; and fixing the landed unmanned transport device to the receiving container with a longitudinal guide, a transverse guide, or both.

10. The method of claim 1, wherein the bearing is a nose bearing, and the contour is a nose contour corresponding to the nose bearing.

11. The method of claim 1, wherein the payload container pivots by no less than five degrees and no more than fifty degrees.

12. The method of claim 1, wherein the payload container has a battery for powering the unmanned transport device, and the receiving container has a device for charging the battery.

13. A method for unloading an unmanned transport device docked on a receiving container with a payload container for a consignment, the receiving container having a loading device for unloading the payload container from the unmanned transport device, the payload container having a bearing at a first end of the payload container, the unmanned transport device having a loading opening in which the payload container is received on an underside of the unmanned transport device, the loading opening having a mating contour corresponding to the bearing and in which the bearing engages at a front end of the loading opening, the method comprising:

raising the loading device until the loading device is positioned beneath the loading opening on the payload container;

unlocking the payload container at a second, opposite end of the payload container;

pivoting of the payload container relative to a horizontal configuration with the loading device such that the second end of the payload container is lowered relative to the first end of the payload container until the bearing disengages from the mating contour;

lowering the payload container relative to the transport device with the loading device; and pivoting the payload container into the horizontal configuration with the loading device.

14. The method of claim 13, wherein:

the loading device has one or both of a tilt cylinder and an actuator;

the tilt cylinder is configured for pivoting the payload container; and the actuator is configured for unlocking the payload container from the transport device, locking the payload container to the transport device, or both.

15. The method of claim 13, further comprising one or more of:

removing the payload container from a storage position and/or a loading module with the loading device, depositing the payload container in the storage position and/or the loading module with the loading device, or both;

opening, closing, or both opening and closing a hatch on a landing platform of the receiving container in order to land the transport device on the receiving container; and fixing the landed unmanned transport device to the receiving container with a longitudinal guide, a transverse guide, or both.

16. The method of claim 13, wherein the bearing is a nose bearing, and the contour is a nose contour corresponding to the nose bearing.

17. The method of claim 13, wherein the payload container pivots by no less than five degrees and no more than fifty degrees.

18. The method of claim 13, wherein the payload container has a battery for powering the unmanned transport device, and the receiving container has a device for charging the battery.

19. A receiving container having a loading device for loading an unmanned transport device with a payload container for a consignment, wherein, the receiving container is configured as one of a mailbox, a parcel box and a Packstation for receiving the consignment, the payload container having a bearing at a first end of the payload container, the unmanned transport device having a loading opening for receiving the payload container on an underside of the unmanned transport device, the loading opening having a mating contour corresponding to the bearing at a front end of the loading opening, and the receiving container comprises a control device configured to pivot the payload container disposed on the loading device with the loading device relative to a horizontal configuration such that the first end of the of the payload container is elevated relative to a second, opposite end of the payload container;

raise the loading device until at least the first end of the payload container is positioned within or beneath the loading opening; and pivot the payload container into the horizontal configuration with the loading device in order to introduce the payload container into the loading opening such that the bearing firstly enters into engagement with the mating contour and the second end of the payload container subsequently enters into engagement with a rear end of the loading opening.

* * * * *